(12) United States Patent
Sun et al.

(10) Patent No.: US 11,039,451 B2
(45) Date of Patent: Jun. 15, 2021

(54) RESOURCE POOL DETERMINING METHOD AND RELATED DEVICE

(71) Applicant: China Academy of Telecommunications Technology, Beijing (CN)

(72) Inventors: Jiancheng Sun, Beijing (CN); Jing Liang, Beijing (CN); Huiying Zhang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 16/485,119

(22) PCT Filed: Feb. 6, 2018

(86) PCT No.: PCT/CN2018/075478
§ 371 (c)(1),
(2) Date: Aug. 9, 2019

(87) PCT Pub. No.: WO2018/145628
PCT Pub. Date: Aug. 16, 2018

(65) Prior Publication Data
US 2019/0373617 A1 Dec. 5, 2019

(30) Foreign Application Priority Data
Feb. 10, 2017 (CN) .......................... 201710073649.X

(51) Int. Cl.
*H04W 72/08* (2009.01)
*H04W 4/40* (2018.01)
(Continued)

(52) U.S. Cl.
CPC ........... *H04W 72/082* (2013.01); *H04W 4/40* (2018.02); *H04W 72/02* (2013.01);
(Continued)

(58) Field of Classification Search
None
See application file for complete search history.

(56) References Cited

U.S. PATENT DOCUMENTS

| 2016/0285935 A1 | 9/2016 | Wu et al. |
| 2017/0006653 A1 | 1/2017 | Zeng et al. |

(Continued)

FOREIGN PATENT DOCUMENTS

| CN | 104936292 A | 9/2015 |
| CN | 104995972 A | 10/2015 |

(Continued)

OTHER PUBLICATIONS

LG Electronics Inc., "Use Case on NR and LTE interoperability," 3GPP TSG-SA #75, S1-162358, San Francisco, USA, Aug. 22-26, 2016.

(Continued)

*Primary Examiner* — Kouroush Mohebbi
(74) *Attorney, Agent, or Firm* — Foley & Lardner LLP

(57) ABSTRACT

Disclosed are a resource pool determining method and a related device, for use in resolving the technical problem in the prior art of possible interference in LTE network communication caused by low resource pool selection accuracy due to lack of accurate network configurations of an NR-V2X terminal in a non-NR network coverage area. The method comprises: an NR-V2X terminal receives assistance information sent by an LTE-V2X terminal, determines a first resource pool on the basis of the assistance information, and performs, using the first resource pool, direct communication with the LTE-V2X terminal within the communication scope of the NR-V2X terminal, the first resource pool being a sending resource pool used by the NR-V2X terminal to perform direction communication with the LTE-V2X terminal.

16 Claims, 2 Drawing Sheets

(51) Int. Cl.
*H04W 72/02* (2009.01)
*H04W 72/04* (2009.01)
*H04W 88/02* (2009.01)

(52) U.S. Cl.
CPC ..... *H04W 72/048* (2013.01); *H04W 72/0453* (2013.01); *H04W 88/02* (2013.01)

(56) References Cited

U.S. PATENT DOCUMENTS

2018/0146453 A1* 5/2018 Hu .................. H04W 72/02
2020/0008025 A1* 1/2020 Lee .................. H04W 4/06

FOREIGN PATENT DOCUMENTS

| CN | 105282863 | A | 1/2016 |
| CN | 105357757 | A | 2/2016 |
| CN | 105766009 | A | 7/2016 |
| CN | 106304366 | A | 1/2017 |
| WO | WO2016159715 | A2 | 10/2016 |
| WO | WO2017171909 | A1 | 10/2017 |
| WO | WO2017190276 | A1 | 11/2017 |

OTHER PUBLICATIONS

LG Electronics, "Considerations on the co-channel coexistence of multiple RATs for V2X," 3GPP TSG RAN WG1 Meeting #86bis, R1-1609185, Lisbon Portugal, Oct. 10-14, 2016.
LG Electronics, "Cross-link interference management for coexistence between NR and LTE," 3GPP TSG RAN WG1 NR-AdHoc Meeting, R1-1702502, Spokane, USA, Jan. 16-20, 2017.
3rd Generation Partnership Project, "Technical Specification Group Services and System Aspects; Study on architecture enhancements for EPS and 5G Systemto support advanced V2X services" 3GPP TR 23.786 Release 16 2 V0.3.0 (Jan. 2018).
Huawei, HiSilicon, "On resource pool sharing between R15 UEs and R14 UEs," 3GPP TSG-RAN WG2 Meeting #101, R2-1801902 (Revision of R2-1712748), Athens, Greece, Feb. 26- Mar. 2, 2018.
LG Electronics Inc., "puR to 38.913 on ev2X requirements," TSG-RAN#73, RP-16152, New Orleans, USA, Sep. 19-22, 2016.
LG Electronics, "Discussion on evolution of 3GPP V2X in Rel-15 and beyond," 3GPP TSG RAN Meeting #74, RP-162194, Vienna, Austria, Dec. 5-8, 2016.

* cited by examiner

RESOURCE POOL DETERMINING METHOD AND RELATED DEVICE

This application is a US National Stage of International Application No. PCT/CN2018/075478, filed Feb. 6, 2018, which claims priority to Chinese Patent Application No. 201710073649.X, filed with the Chinese Patent Office on Feb. 10, 2017, and entitled "Method and device for determining a resource pool", both of which are hereby incorporated by reference in their entireties.

This application claims priority to Chinese Patent Application No. 201710073649.X, filed with the Chinese Patent Office on Feb. 10, 2017, and entitled "Method and device for determining a resource pool", which is hereby incorporated by reference in its entirety.

FIELD

The present invention relates to the field of communications, and particularly to a method and device for determining a resource pool.

BACKGROUND

In the Vehicle to Vehicle (V2V) technologies in the Internet of Vehicles, vehicles are connected with each other by a Long Term Evolution (LTE) network in the Rel-14 so that they can communicate with each other via an LTE Uu interface, or can communicate with each other directly via a PC-5 interface.

In the Vehicle to Everything (V2X) technologies in the Internet of Vehicles, vehicles and pedestrians communicate with each other, and vehicles and roadside devices communicate with each other, in the Rel-14 further to the V2V technologies above.

In future Next-generation Radio Access Technology (RAT) (NR) systems, the V2X technologies will further evolve, so an NR-V2X terminal shall be compatible and communicate with an LTE-V2X terminal so that the LTE-V2X terminal and the NR-V2X terminal can interoperate with each other in the network.

In real communication, the NR-V2X terminal may not be configured precisely in the network if it is offline, so the NR-V2X terminal shall be preconfigured with a list of resource pools including all the transmission resource pools available to the NR-V2X terminal, and the NR-V2X terminal can select a resource pool from the list of resource pools so that the NR-V2X terminal and the LTE-V2X terminal can communicate with each other. However the transmission resource pool selected from the preconfigured list of resource pools may conflict with the existing LTE network resources, thus interfering with communication over the LTE network. Accordingly there is such a technical problem in the prior art that the NR-V2X terminal fails to be configured precisely by the network in an area which is not covered with any NR network, and thus may select a resource pool imprecisely, thus interfering with communication over the LTE network.

SUMMARY

Embodiments of the invention provide a method and device for determining a resource pool so as to address the technical problem in the prior art that the NR-V2X terminal fails to be configured precisely by the network in an area which is not covered with any NR network, and thus may select a resource pool imprecisely, thus interfering with communication over the LTE network.

Specific technical solutions according to the embodiments of the invention are as follows.

In a first aspect, an embodiment of the invention provides a method for determining a resource pool, the method including:

receiving, by an NR-V2X terminal, assistance information transmitted by an LTE-V2X terminal;

determining, by the NR-V2X terminal, a first resource pool based upon the assistance information, wherein the first resource pool is a transmission resource pool for direct communication by the NR-V2X terminal with the LTE-V2X terminal; and communicating, by the NR-V2X terminal, directly with the LTE-V2X terminal in a communication range of an NR-V2X terminal using the first resource pool.

In a possible implementation, the assistance information includes any one or combination of:

a part of a parameter configuration for LTE network communication by the LTE-V2X terminal, wherein the part of the parameter configuration includes at least configuration parameters of a cell where the LTE-V2X terminal resides, and a TDD sub-frame configuration pattern for the LTE-V2X terminal, wherein the configuration parameters of the cell include a cell frequency and a system bandwidth;

parameter configurations for direct communication by the LTE-V2X terminal; and parameter configurations for direct communication by the NR-V2X terminal with the LTE-V2X terminal.

In a possible implementation, receiving, by the NR-V2X terminal, the assistance information transmitted by the LTE-V2X terminal includes:

receiving, by the NR-V2X terminal, the assistance information generated by an LTE base station, and forwarded through the LTE-V2X terminal.

In a possible implementation, the assistance information is a part of a parameter configuration for LTE network communication by the LTE-V2X terminal, or parameter configurations for direct communication by the LTE-V2X terminal; and receiving, by the NR-V2X terminal, the assistance information transmitted by the LTE-V2X terminal includes:

receiving, by the NR-V2X terminal, a part of the parameter configuration obtained by the LTE-V2X terminal from the parameter configuration for LTE network communication in a system message and/or dedicated signaling, and transmitted by the LTE-V2X terminal; or receiving, by the NR-V2X terminal, the parameter configurations for direction communication obtained by the LTE-V2X terminal from a system message and/or dedicated signaling, and transmitted by the LTE-V2X terminal.

In a possible implementation, determining, by the NR-V2X terminal, the first resource pool based upon the assistance information includes:

determining, by the NR-V2X terminal, according to the assistance information whether direct communication by the NR-V2X terminal with the LTE-V2X terminal using a second resource pool interferes with LTE network communication, wherein the second resource pool is a transmission resource pool used by the NR-V2X for direct communication with the LTE-V2X terminal in the communication range of the NR-V2X terminal before the NR-V2X terminal receives the assistance information; and if so, then adjusting, by the NR-V2X terminal, the transmission resource pool for direct communication with the LTE-V2X terminal from the second resource pool to the first resource pool according to the assistance information.

In a possible implementation, receiving, by the NR-V2X terminal, the assistance information transmitted by the LTE-V2X terminal includes:

receiving, by the NR-V2X terminal, first assistance information transmitted by a first LTE-V2X terminal at a first instance of time, wherein the first LTE-V2X terminal is any one of LTE-V2X terminals in the communication range of the NR-V2X terminal; and adjusting, by the NR-V2X terminal, the transmission resource pool for direct communication with the LTE-V2X terminal from the second resource pool to the first resource pool according to the assistance information includes:

determining, by the NR-V2X terminal, whether other assistance information transmitted by another LTE-V2X terminal than the first LTE-V2X terminal is received in a preset time period after the first instance of time, and if not, then adjusting, by the NR-V2X terminal, the transmission resource pool for direct communication with the LTE-V2X terminal from the second resource pool to the first resource pool based upon the first assistance information.

In a possible implementation, receiving, by the NR-V2X terminal, the assistance information transmitted by the LTE-V2X terminal includes:

receiving, by the NR-V2X terminal, a plurality of sets of parameter configurations, transmitted by a plurality of LTE-V2X terminals at same instance of time, wherein each set of parameter configuration is a part of a parameter configuration, corresponding to each LTE-V2X terminal, for LTE network communication; and adjusting, by the NR-V2X terminal, the transmission resource pool for direct communication with the LTE-V2X terminal from the second resource pool to the first resource pool according to the assistance information includes:

determining, by the NR-V2X terminal, whether there is a resource pool, in a list of resource pools, with a parameter different from at least one parameter in the each set of parameter configuration, and if so, then determining, by the NR-V2X terminal, the resource pool with a parameter different from at least one parameter in the each set of parameter configuration as the first resource pool.

In a possible implementation, if there is no resource pool, in the list of resource pools, with a parameter different from at least one parameter in the each set of parameter configuration, then the method further includes: determining, by the NR-V2X terminal, the second transmission resource pool as the first resource pool.

In a possible implementation, receiving, by the NR-V2X terminal, the assistance information transmitted by the LTE-V2X terminal includes:

receiving, by the NR-V2X terminal, parameter configurations, for direct communication by the NR-V2X terminal with the LTE-V2X terminal, transmitted by the LTE-V2X terminal, or parameter configurations for direct communication by the NR-V2X terminal with the LTE-V2X terminal; and determining, by the NR-V2X terminal, the first resource pool based upon the assistance information includes:

selecting, by the NR-V2X terminal, any one set of parameter configuration from the parameter configurations for direct communication by the LTE-V2X terminal, or the parameter configurations for direct communication by the NR-V2X terminal with the LTE-V2X terminal as a parameter configuration to be used, and determining, by the NR-V2X terminal, a resource pool corresponding to the parameter configuration to be used, as the first resource pool.

In a second aspect, an embodiment of the invention provides a method for determining a resource pool, the method including:

transmitting, by an LTE-V2X terminal, assistance information to an NR-V2X terminal so that the NR-V2X terminal determines a first resource pool according to the assistance information, wherein the first resource pool is a transmission resource pool for direct communication by the NR-V2X terminal with the LTE-V2X terminal.

In a possible implementation, the assistance information includes any one or combination of:

a part of a parameter configuration for LTE network communication by the LTE-V2X terminal, wherein the part of the parameter configuration includes at least configuration parameters of a cell where the LTE-V2X terminal resides and a TDD sub-frame configuration pattern for the LTE-V2X terminal, wherein the configuration parameters of the cell include a cell frequency and a system bandwidth;

parameter configurations for direct communication by the LTE-V2X terminal; or parameter configurations for direct communication by the NR-V2X terminal with the LTE-V2X terminal.

In a possible implementation, transmitting, by the LTE-V2X terminal, the assistance information to the NR-V2X terminal includes:

receiving, by the LTE-V2X terminal, the assistance information generated and transmitted by an LTE base station; and forwarding, by the LTE-V2X terminal, the assistance information to the NR-V2X terminal.

In a possible implementation, the assistance information is a part of the parameter configuration for LTE network communication by the LTE-V2X terminal, or parameter configurations for direct communication by the LTE-V2X terminal; and transmitting, by the LTE-V2X terminal, the assistance information to the NR-V2X terminal includes:

obtaining, by the LTE-V2X terminal, a part of the parameter configuration for LTE network communication in a system message and/or dedicated signaling, and transmitting, by the LTE-V2X terminal, the part of the parameter configuration to the NR-V2X terminal, or transmitting, by the LTE-V2X terminal, the assistance information to the NR-V2X terminal includes:

obtaining, by the LTE-V2X terminal, the parameter configurations for direct communication by the LTE-V2X terminal from a system message and/or dedicated signaling, and transmitting the parameter configurations.

In a third aspect, an embodiment of the invention provides a terminal including:

a first receiving module configured to receive assistance information transmitted by an LTE-V2X terminal;

a first determining module configured to determine a first resource pool based upon the assistance information, wherein the first resource pool is a transmission resource pool for direct communication by the NR-V2X terminal with the LTE-V2X terminal; and a first communicating module configured to communicate directly with the LTE-V2X terminal in a communication range of an NR-V2X terminal using the first resource pool.

In a possible implementation, the assistance information includes any one or combination of:

a part of a parameter configuration for LTE network communication by the LTE-V2X terminal, wherein the part of the parameter configuration includes at least configuration parameters of a cell where the LTE-V2X terminal resides and a TDD sub-frame configuration pattern for the LTE-V2X terminal, wherein the configuration parameters of the cell include a cell frequency and a system bandwidth;

parameter configurations for direct communication by the LTE-V2X terminal; or parameter configurations for direct communication by the NR-V2X terminal with the LTE-V2X terminal.

In a possible implementation, the first receiving module is configured:

to receive the assistance information generated by an LTE base station, and forwarded through the LTE-V2X terminal.

In a possible implementation, the assistance information is a part of a parameter configuration for LTE network communication by the LTE-V2X terminal, or parameter configurations for direct communication by the LTE-V2X terminal; and the first receiving module is configured:

to receive a part of the parameter configuration obtained by the LTE-V2X terminal from the parameter configuration for LTE network communication in a system message and/or dedicated signaling, and transmitted by the LTE-V2X terminal; or to receive the parameter configurations for direction communication obtained by the LTE-V2X terminal from a system message and/or dedicated signaling, and transmitted by the LTE-V2X terminal.

In a possible implementation, the first determining module is configured:

to determine according to the assistance information whether direct communication by the NR-V2X terminal with the LTE-V2X terminal using a second resource pool interferes with LTE network communication, wherein the second resource pool is a transmission resource pool used by the NR-V2X for direct communication with the LTE-V2X terminal in the communication range of the NR-V2X terminal before the NR-V2X terminal receives the assistance information; and if so, to adjust the transmission resource pool for direct communication with the LTE-V2X terminal from the second resource pool to the first resource pool according to the assistance information.

In a possible implementation, the first receiving module is configured to receive first assistance information transmitted by a first LTE-V2X terminal at a first instance of time, wherein the first LTE-V2X terminal is any one of LTE-V2X terminals in the communication range of the NR-V2X terminal; and the first determining module is configured: to determine whether other assistance information transmitted by another LTE-V2X terminal than the first LTE-V2X terminal is received in a preset time period after the first instance of time, and if not, to adjust the transmission resource pool for direct communication with the LTE-V2X terminal from the second resource pool to the first resource pool based upon the first assistance information.

In a possible implementation, the first receiving module is configured to receive a plurality of sets of parameter configurations at the same instance of time, transmitted by a plurality of corresponding LTE-V2X terminals, wherein each set of parameter configuration is a part of a parameter configuration, corresponding to each LTE-V2X terminal, for LTE network communication; and the first determining module is configured to determine whether there is a resource pool, in the list of resource pools, with a parameter different from at least one parameter in the each set of parameter configuration, and if so, to determine the resource pool with a parameter different from at least one parameter in the each set of parameter configuration as the first resource pool.

In a possible implementation, if there is no resource pool, in the list of resource pools, with a parameter different from at least one parameter in the each set of parameter configuration, then the first determining module is further configured to determine the second transmission resource pool as the first resource pool.

In a possible implementation, the first receiving module is configured to receive parameter configurations, for direct communication by the LTE-V2X terminal, transmitted by the LTE-V2X terminal, or to receive parameter configurations for direct communication by the NR-V2X terminal with the LTE-V2X terminal; and the first determining module is configured to select any one set of parameter configuration from the parameter configurations for direct communication by the LTE-V2X terminal, or the parameter configurations for direct communication by the NR-V2X terminal with the LTE-V2X terminal as a parameter configuration to be used, and to determine a resource pool corresponding to the parameter configuration to be used, as the first resource pool.

In a fourth aspect, an embodiment of the invention provides a terminal including:

a first transmitting module configured to transmit assistance information to an NR-V2X terminal so that the NR-V2X terminal determines a first resource pool according to the assistance information, wherein the first resource pool is a transmission resource pool for direct communication by the NR-V2X terminal with an LTE-V2X terminal.

In a possible implementation, the assistance information includes any one or combination of:

a part of a parameter configuration for LTE network communication by the LTE-V2X terminal, wherein the part of the parameter configuration includes at least configuration parameters of a cell where the LTE-V2X terminal resides and a TDD sub-frame configuration pattern for the LTE-V2X terminal, wherein the configuration parameters of the cell include a cell frequency and a system bandwidth;

parameter configurations for direct communication by the LTE-V2X terminal; or parameter configurations for direct communication by the NR-V2X terminal with the LTE-V2X terminal.

In a possible implementation, the first transmitting module is configured:

to receive the assistance information generated and transmitted by an LTE base station; and to forward the assistance information to the NR-V2X terminal.

In a possible implementation, the assistance information is a part of a parameter configuration for LTE network communication by the LTE-V2X terminal, or parameter configurations for direct communication by the LTE-V2X terminal; and the first transmitting module is configured:

to obtain a part of the parameter configuration for LTE network communication in a system message and/or dedicated signaling, and to transmit the part of the parameter configuration to the NR-V2X terminal; or the first transmitting module is configured:

to obtain the parameter configurations for direct communication by the LTE-V2X terminal from a system message and/or dedicated signaling, and to transmit the parameter configurations.

In a fifth aspect, an embodiment of the invention provides a terminal including: a processor, a transceiver, and a memory, wherein:

the processor is configured to read and execute program in the memory: to receive assistance information transmitted by an LTE-V2X terminal through the transceiver, to determine a first resource pool based upon the assistance information, and to communicate directly with the LTE-V2X terminal in a communication range of an NR-V2X terminal using the first resource pool, wherein the first resource pool is a transmission resource pool for direct communication by the NR-V2X terminal with the LTE-V2X terminal; and the transceiver configured to receive and transmit data under the control of the processor.

In a possible implementation, the assistance information includes any one or combination of:

a part of a parameter configuration for LTE network communication by the LTE-V2X terminal, wherein the part of the parameter configuration includes at least configuration parameters of a cell where the LTE-V2X terminal resides, and a TDD sub-frame configuration pattern for the LTE-V2X terminal, wherein the configuration parameters of the cell include a cell frequency and a system bandwidth;

parameter configurations for direct communication by the LTE-V2X terminal; or parameter configurations for direct communication by the NR-V2X terminal with the LTE-V2X terminal.

In a possible implementation, the processor is configured:

to instruct the transceiver to receive the assistance information generated by an LTE base station, and forwarded through the LTE-V2X terminal.

In a possible implementation, the assistance information is a part of a parameter configuration for LTE network communication by the LTE-V2X terminal, or a parameter configuration for direct communication by the LTE-V2X terminal; and the processor is configured:

to instruct the transceiver to receive a part of the parameter configuration obtained by the LTE-V2X terminal from the parameter configuration for LTE network communication in a system message and/or dedicated signaling, and transmitted by the LTE-V2X terminal; or to instruct the transceiver to receive the parameter configurations for direction communication obtained by the LTE-V2X terminal from a system message and/or dedicated signaling, and transmitted by the LTE-V2X terminal.

In a possible implementation, the processor is configured:

to determine according to the assistance information whether direct communication by the NR-V2X terminal with the LTE-V2X terminal using a second resource pool interferes with LTE network communication, wherein the second resource pool is a transmission resource pool used by the NR-V2X for direct communication with the LTE-V2X terminal in the communication range of the NR-V2X terminal before the NR-V2X terminal receives the assistance information; and if so, to adjust the transmission resource pool for direct communication with the LTE-V2X terminal from the second resource pool to the first resource pool according to the assistance information.

In a possible implementation, the processor is configured:

to instruct the transceiver to receive first assistance information transmitted by a first LTE-V2X terminal at a first instance of time, wherein the first LTE-V2X terminal is any one of LTE-V2X terminals in the communication range of the NR-V2X terminal;

to determine whether other assistance information transmitted by another LTE-V2X terminal than the first LTE-V2X terminal is received in a preset time period after the first instance of time; and if not, to adjust the transmission resource pool for direct communication with the LTE-V2X terminal from the second resource pool to the first resource pool based upon the first assistance information.

In a possible implementation, the processor is configured:

to instruct the transceiver to receive a plurality of sets of parameter configurations at the same instance of time, transmitted by a plurality of LTE-V2X terminals, wherein each set of parameter configuration is a part of a parameter configuration, corresponding to each LTE-V2X terminal, for LTE network communication;

to determine whether there is a resource pool, in the list of resource pools, with a parameter different from at least one parameter in the each set of parameter configuration; and if so, to determine the resource pool with a parameter different from at least one parameter in the each set of parameter configuration as the first resource pool.

In a possible implementation, the processor is further configured: if there is no resource pool, in the list of resource pools, with a parameter different from at least one parameter in the each set of parameter configuration, to determine the second transmission resource pool as the first resource pool.

In a possible implementation, the processor is configured:

to instruct the transceiver to receive parameter configurations, for direct communication by the LTE-V2X terminal, transmitted by the LTE-V2X terminal, or parameter configurations for direct communication by the NR-V2X terminal with the LTE-V2X terminal;

to select any one set of parameter configuration from the parameter configurations for direct communication by the LTE-V2X terminal, or the parameter configurations for direct communication by the NR-V2X terminal with the LTE-V2X terminal as a parameter configuration to be used; and to determine a resource pool corresponding to the parameter configuration to be used, as the first resource pool.

In a sixth aspect, an embodiment of the invention provides a terminal including: a processor, a transceiver, and a memory, wherein:

the processor is configured to read and execute program in the memory: to transmit assistance information to an NR-V2X terminal through the transceiver so that the NR-V2X terminal determines a first resource pool according to the assistance information, wherein the first resource pool is a transmission resource pool for direct communication by the NR-V2X terminal with the LTE-V2X terminal; and the transceiver configured to receive and transmit data under the control of the processor.

In a possible implementation, the assistance information includes any one or combination of:

a part of a parameter configuration for LTE network communication by the LTE-V2X terminal, wherein the part of the parameter configuration includes at least configuration parameters of a cell where the LTE-V2X terminal resides, and a TDD sub-frame configuration pattern for the LTE-V2X terminal, wherein the configuration parameters of the cell include a cell frequency and a system bandwidth;

parameter configurations for direct communication by the LTE-V2X terminal; or parameter configurations for direct communication by the NR-V2X terminal with the LTE-V2X terminal.

In a possible implementation, the processor is configured:

to instruct the transceiver to receive the assistance information generated and transmitted by an LTE base station; and to instruct the transceiver to forward the assistance information to the NR-V2X terminal.

In a possible implementation, the assistance information is a part of a parameter configuration for LTE network communication by the LTE-V2X terminal, or a parameter configuration for direct communication by the LTE-V2X terminal; and the processor is configured:

to instruct the transceiver to obtain a part of the parameter configuration for LTE network communication in a system message and/or dedicated signaling, and to instruct the transceiver to transmit the part of the parameter configuration to the NR-V2X terminal; or to instruct the transceiver to obtain the parameter configurations for direct communication by the LTE-V2X terminal from a system message and/or dedicated signaling, and to transmit the parameter configurations through the transceiver.

In a seventh aspect, an embodiment of the invention provides a computer readable storage medium storing computer executable instructions configured to cause the computer to perform the method according to any one of the solutions in the first aspect above.

In an eighth aspect, an embodiment of the invention provides a computer readable storage medium storing computer executable instructions configured to cause the computer to perform the method according to any one of the solutions in the second aspect above.

With the technical solutions above according to the embodiments of the invention, an NR-V2X terminal receives assistance information transmitted by an LTE-V2X terminal, the NR-V2X terminal determines a transmission resource pool for direct communication with the LTE-V2X terminal as a first resource pool based upon the assistance information, and the NR-V2X terminal communicates directly with the LTE-V2X terminal in a communication range of the NR-V2X terminal over the first resource pool. In this way, the NR-V2X terminal can determine the transmission resource pool according to the assistance information transmitted by the LTE-V2X terminal while precluding transmission resources, e.g., with a frequency, a TDD subframe configuration pattern, etc., colliding with network resources for LTE network communication by the LTE-V2X terminal, to thereby avoid interference with LTE network communication as much as possible. Accordingly the technical solutions according to the embodiments of the invention can address in effect the technical problem in the prior art that the NR-V2X terminal fails to be configured precisely by the network in an area which is not covered with any NR network, and thus may select a resource pool imprecisely, thus interfering with communication over the LTE network.

DETAILED DESCRIPTION

In order to make the objects, technical solutions, and advantages of the invention more apparent, the invention will be described below in details with reference to the drawings, and apparently the embodiments to be described below are only a part but not all of the embodiments of the invention. Based upon the embodiments here of the invention, all the other embodiments which can occur to those ordinarily skilled in the art without any inventive effort shall fall into the scope of the invention.

Before describing the method for determining a resource pool according to the embodiment of the invention, firstly an application scenario of a method for determining a resource pool according to an embodiment of the invention will be described.

I. In an Area Covered by Only an LTE Network.

In an area covered by only an LTE network, an NR-V2X terminal can only conduct end-to-end communication in a V2X direct communication mode, and the NR-V2X terminal shall be able to communicate with another NR-V2X terminal, but also able to communicate directly with an LTE-V2X terminal. When the NR-V2X terminal is backward compatible and communicate directly with the LTE-V2X terminal, then a transmission resource pool used by the NR-V2X terminal may interfere with the LTE network.

II. In an Area Covered by Both an LTE Network and an NR Network.

In an area covered by both an LTE network and an NR network, an LTE-V2X terminal and an NR-V2X terminal are registered respectively in the LTE network and the NR network, and the terminals can at least communicate with each other indirectly over the networks no matter whether they can support V2X direct communication. However when the LTE-V2X terminal and the NR-V2X terminal are to conduct direct V2X communication in this area, a transmission resource used by the NR-V2X terminal backward compatible and communicating directly with the LTE-V2X terminal may also interfere with the LTE network.

Figure 1:
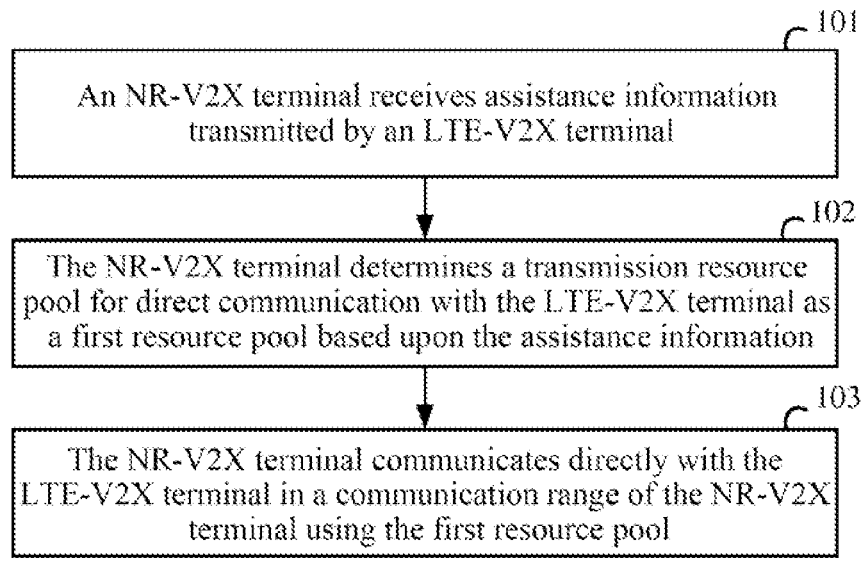
FIG. 1 is a schematic flow chart of a method for determining a resource pool according to an embodiment of the invention.

Accordingly in order to alleviate the interference to the communication in LTE network when the NR-V2X terminal communicates directly with the LTE-V2X terminal in the two application scenarios above, an embodiment of the invention provides a method for determining a resource pool as illustrated in FIG. 1, where the method particularly includes the following steps.

In the step 101, an NR-V2X terminal receives assistance information transmitted by an LTE-V2X terminal.

In the step 102, the NR-V2X terminal determines a transmission resource pool for direct communication with the LTE-V2X terminal as a first resource pool based upon the assistance information.

In the step 103, the NR-V2X terminal communicates directly with the LTE-V2X terminal in a communication range of the NR-V2X terminal using the first resource pool.

In the embodiment of the invention, the NR-V2X terminal specifically can be an NR-V2X vehicle, an NR-V2X pedestrian or roadside device, or another type of NR-V2X terminal, although the embodiment of the invention will not be limited thereto. Correspondingly the LTE-V2X terminal specifically can be an LTE-V2X vehicle, an LTE-V2X pedestrian or roadside device, or another type of LTE-V2X terminal, although the embodiment of the invention will not be limited thereto.

In the embodiment of the invention, the assistance information includes any one or combination of:

A part of a parameter configuration for LTE network communication by the LTE-V2X terminal, where the part of the parameter configuration includes at least one of: configuration parameters of a cell where the LTE-V2X terminal resides and a TDD sub-frame configuration pattern for the LTE-V2X terminal, where the configuration parameters of the cell include a cell frequency and a system bandwidth;

Parameter configurations for direct communication by the LTE-V2X terminal; or

Parameter configurations for direct communication by the NR-V2X terminal with the LTE-V2X terminal.

In the embodiment of the invention, the assistance information includes but will not be limited to the following several instances which will be described below respectively.

In a First Instance

The assistance information is a part of a parameter configuration for communication by the LTE-V2X terminal via an air interface, etc., a Uu interface, after residing in a cell, e.g., a cell frequency and a system bandwidth of the cell where the LTE-V2X terminal resides. By way of an example, the system bandwidth can include 1.4M, 5M, or 20M in an LTE network. When the LTE-V2X terminal is a TDD-LTE terminal, the assistance information can include a TDD sub-frame configuration pattern, etc., of the LTE-V2X terminal, although the embodiment of the invention will not be limited thereto.

In a Second Instance

The assistance information is a full set of transmission resource pool information for direct communication, i.e., for transmitting information via a PC-5 interface, configured by an LTE network for the LTE-V2X terminal, e.g., a resource pool A (a frequency, a system bandwidth, a TDD sub-frame configuration pattern, etc.), a resource pool B (a frequency, a system bandwidth, a TDD sub-frame configuration pattern, etc.), a resource pool C (a frequency, a system bandwidth, a TDD sub-frame configuration pattern, etc.), etc, or other resource pool, although the embodiment of the invention will not be limited thereto.

In this case, the LTE-V2X terminal can communicate directly with another LTE-V2X terminal or the NR-V2X terminal, although the embodiment of the invention will not be limited thereto.

In a Third Instance

The assistance information is a full set of transmission resource pool information for direct communication, i.e., for transmitting information via a PC-5 interface, with the LTE-V2X terminal, configured by an LTE base station for the NR-V2X terminal according to configuration and resource use conditions of the LTE base station, e.g., a resource pool A (a frequency, a system bandwidth, a TDD sub-frame configuration pattern, etc.), a resource pool B (a frequency, a system bandwidth, a TDD sub-frame configuration pattern, etc.), a resource pool C (a frequency, a system bandwidth, a TDD sub-frame configuration pattern, etc.), etc, or other resource pools, although the embodiment of the invention will not be limited thereto.

In a Fourth Instance

The assistance information includes a part of a parameter configuration for communication by the LTE-V2X terminal via an air interface, etc., a Uu interface, after residing in a cell, information about a full set of transmission resource pool information for direct communication, i.e., for transmitting information via a PC-5 interface, configured by an LTE network for the LTE-V2X terminal, and a full set of transmission resource pool information for direct communication with the LTE-V2X terminal, configured by an LTE network for the NR-V2X terminal.

Those ordinarily skilled in the art can select one of the four instances of the assistance information above as needed in reality, although the embodiment of the invention will not be limited thereto.

After the step 101 is performed, the step 102 is performed in which the NR-V2X terminal determines the transmission resource pool for direct communication with the LTE-V2X terminal as the first resource pool based upon the assistance information.

In the embodiment of the invention, firstly a specific implementation of the step 102 will be described from the perspective of a source of the assistance information, where there are the following two implementations of the source of the assistance information as to be described below respectively.

In a First Implementation

The NR-V2X terminal receives the assistance information generated by the LTE base station and forwarded through the LTE-V2X terminal.

In the embodiment of the invention, the LTE base station transmits the assistance information to the LTE-V2X terminal in a radio resource control message, e.g., a Master Information Block (MIB) or another new radio resource control message, or carries the assistance information in a media access control layer control element, and transmits the control element to the LTE-V2X terminal, although the embodiment of the invention will not be limited thereto.

In a specific implementation, in addition to transmitting, to the LTE-V2X terminal, the network resource for LTE network communication by the LTE-V2X terminal, the LTE base station further carries the assistance information, for the NR-V2X terminal to determine the resource pool, generated by the LTE base station according to the configuration and resource use conditions of the LTE base station, in the system message and/or dedicated signaling carrying the network resource.

In a Second Implementation

When the assistance information is specifically a part of the parameter configuration for LTE network communication by the LTE-V2X terminal, or the parameter configuration for direct communication by the LTE-V2X terminal, then the NR-V2X terminal receives the assistance information transmitted by the LTE-V2X terminal as follows: the NR-V2X terminal receives a part of the parameter configuration obtained by the LTE-V2X terminal from the parameter configuration for LTE network communication in the system message and/or the dedicated signaling, and transmitted by the LTE-V2X terminal; or the NR-V2X terminal receives the parameter configuration for direction communication obtained by the LTE-V2X terminal from the system message and/or the dedicated signaling, and transmitted by the LTE-V2X terminal.

In a specific implementation, when the assistance information is specifically the first and second instances of the assistance information above, the assistance information can alternatively be obtained and generated by the LTE-V2X terminal. For example, the LTE-V2X terminal can obtain a part of the parameter configuration for LTE network communication in the system message and/or the dedicated signaling broadcasted by the LTE base station, and then transmit the part of the parameter configuration to the NR-V2X terminal, where the obtained parameter configuration can include a cell frequency and a system bandwidth of the cell where the LTE-V2X terminal resides, or the obtained parameter configuration can include a TDD subframe configuration pattern for the LTE-V2X terminal. In another example, the LTE-V2X terminal can obtain the parameter configuration for direct communication by the LTE-V2X terminal from the dedicated signaling transmitted by the LTE base station, store the obtained parameter configuration for direct communication, and transmit it to the NR-V2X terminal as needed.

Those ordinarily skilled in the art can select one of the two implementations above as needed in reality, although the embodiment of the invention will not be limited thereto.

After the source of the assistance information is described, the specific implementation of the step 102 will be described from the perspective of how the NR-V2X terminal uses the assistance information specifically in the following steps after obtaining the assistance information.

The NR-V2X terminal determines according to the assistance information whether direct communication by the NR-V2X terminal with the LTE-V2X terminal over a second resource pool interferes with LTE network communication, and if so, then the NR-V2X terminal adjusts the transmission resource pool for direct communication with the LTE-V2X terminal from the second resource pool to the first resource pool according to the assistance information, where the second resource pool is a transmission resource pool used by the NR-V2X for direct communication with the LTE-V2X terminal in the communication range of the NR-V2X terminal before the NR-V2X terminal receives the assistance information.

In a specific implementation, before the NR-V2X terminal receives the assistance information transmitted by the LTE-V2X terminal, the NR-V2X terminal selects a transmission resource pool, e.g., a second resource pool, from a list of resource pools, and communicates directly with the LTE-V2X terminal over the second resource pool. In the embodiment of the invention, the list of resource pools includes a list of resource pools including all the transmission resource pools available to the NR-V2X terminal, e.g., transmission resource pools A, B, C, and D, or other transmission resource pools, although the embodiment of the invention will not be limited thereto. The list of resource pools is preconfigured for the NR-V2X terminal.

In the embodiment of the invention, upon reception of the assistance information transmitted by the LTE-V2X terminal, the NR-V2X terminal firstly determines whether direct communication with the LTE-V2X terminal over the second resource pool interferes with the LTE network, and for example, if a frequency band for direct communication by the NR-V2X terminal with the LTE-V2X terminal overlaps with a frequency band for LTE network communication by the LTE-V2X terminal, then the direct communication interferes with the LTE network.

In a specific implementation, if direct communication by the NR-V2X terminal with the LTE-V2X terminal over the second resource pool interferes with the LTE network, then the NR-V2X terminal adjusts the transmission resource pool for direct communication with the LTE-V2X terminal from the second resource pool to the first resource pool according to the assistance information.

In the embodiment of the invention, there are the following three instances of the particular implementation of the step above as to be described below respectively.

In a First Instance

The NR-V2X terminal receives first assistance information transmitted by a first LTE-V2X terminal at a first instance of time, where the first LTE-V2X terminal is any one of LTE-V2X terminals in the communication range of the NR-V2X terminal.

In a specific implementation, the NR-V2X terminal receives assistance information transmitted by only one LTE-V2X terminal at the first instance of time, where the assistance information includes any one of the three instances of the assistance information above. In this case, the NR-V2X terminal determines a transmission resource pool according to the assistance information transmitted by the LTE-V2X terminal upon reception of the assistance information. Then in a real implementation, the NR-V2X terminal further receives other assistance information transmitted by another LTE-V2X terminal shortly after the assistance information is received, so that parameter information corresponding to the transmission resource pool which was just determined conflicts with the other assistance information, thus interfering with LTE network communication, so the NR-V2X terminal shall determine a transmission resource pool again, thus resulting in a waste of system resources.

Accordingly in order to avoid the NR-V2X terminal from determining a transmission resource pool immediately upon reception of the first assistance information transmitted by the first LTE-V2X terminal so that the NR-V2X terminal may determine a transmission resource pool frequently, a technical solution including the following steps is provided in the embodiment of the invention.

The NR-V2X terminal determines whether other assistance information transmitted by another LTE-V2X terminal than the first LTE-V2X terminal is received in a preset time period after the first instance of time, and if not, then the NR-V2X terminal adjusts based upon the first assistance information the transmission resource pool for direct communication with the LTE-V2X terminal from the second resource pool to the first resource pool.

In the embodiment of the invention, the preset time period specifically can be a time period from the time when the NR-V2X terminal receives the assistance information to the time when the NR-V2X terminal needs to transmit information via a PC-5 interface, or a time period which is set as needed reality, e.g., 5, 8, 10, etc., minutes, or another preset time period, and can be set by those ordinarily skilled in the art as needed in reality, although the embodiment of the invention will not be limited thereto.

In a specific implementation, the preset time period is 5 minutes, for example, and after the NR-V2X terminal receives the first assistance information transmitted by the first LTE-V2X terminal, the NR-V2X terminal determines whether other assistance information transmitted by another LTE-V2X terminal is received in 5 minutes after the first instance of time, instead of adjusting the second resource pool according to the first assistance information.

In the embodiment of the invention, if no other assistance information transmitted by another LTE-V2X terminal is received in the preset time period after the first instance of time, then the NR-V2X terminal adjusts the second resource pool according to the first assistance information, and specifically a resource pool with a different part of the parameter configuration of the LTE-V2X terminal can be selected from the list of resource pools as the first resource pool; or any one set of parameter configuration can be selected from the parameter configurations for direct communication by the LTE-V2X terminal, or the parameter configurations for direct communication by the NR-V2X terminal with the LTE-V2X terminal, and a resource pool corresponding to the any one set of configuration parameter can be determined as the first resource pool.

In the embodiment of the invention, if other assistance information transmitted by another LTE-V2X terminal, e.g., second assistance information transmitted by a second LTE-V2X terminal, is received in the preset time period, then a transmission resource pool can be adjusted from the second resource pool to the first resource pool according to the first assistance information and the second assistance information in this case.

In a specific implementation, for example, the first assistance information and the second assistance information is cell frequencies of cells where the first LTE-V2X terminal and the second LTE-V2X terminal reside, e.g., 1920 MHz and 2025 MHz; and for example, the list of resource pools includes transmission resource pools A, B, and C, and for example, a frequency corresponding to the transmission resource pool A is 1920 MHz, a frequency corresponding to the transmission resource pool B is 2025 MHz, and a frequency corresponding to the transmission resource pool C is 1910 MHz, so a resource pool with another frequency than 1920 MHz and 2025 MHz, i.e., the transmission resource pool C, is selected from the list of resource pools as the first resource pool.

With the technical solution according to the embodiment of the invention, the NR-V2X terminal can be avoided from switching a transmission resource pool frequently, for the technical effect of improving the utilization efficiency of system resources.

In a Second Instance

The NR-V2X terminal receives a plurality of sets of parameter configuration, transmitted by a plurality of LTE-V2X terminals at the same instance of time, the plurality of sets of parameter configuration corresponding to the plurality of LTE-V2X terminals, where each set of parameter configuration is a part of a parameter configuration, corresponding to each LTE-V2X terminal, for LTE network communication.

The NR-V2X terminal determines whether there is a resource pool, in the list of resource pools, with a parameter different from at least one parameter in the each set of parameter configuration, and if so, then the NR-V2X terminal determines the resource pool with a parameter different from at least one parameter in the each set of parameter configuration as the first resource pool.

In a specific implementation, the NR-V2X terminal receives over a plurality of receiving resource pools a plurality of sets of parameter configurations, corresponding to a plurality of LTE-V2X terminals, transmitted by the plurality of LTE-V2X terminals at the same instance of time, where each set of parameter configuration is a part of a parameter configuration, corresponding to each LTE-V2X terminal, for LTE network communication, e.g., a part of a first set of parameter configuration transmitted by the first LTE-V2X terminal, and a part of a second set of parameter configuration transmitted by the second LTE-V2X terminal, where the two parts of the sets of parameter configuration include cell frequencies of cells where the first LTE-V2X terminal and the second LTE-V2X terminal reside, e.g., 1920 MHz and 2025 MHz.

For example, the list of resource pools includes transmission resource pools A, B, and C, and for example, a frequency corresponding to the transmission resource pool A is 1920 MHz, a frequency corresponding to the transmission resource pool B is 2025 MHz, and a frequency corresponding to the transmission resource pool C is 1910 MHz, so a resource pool with another frequency than 1920 MHz and 2025 MHz, i.e., the transmission resource pool C, is selected from the list of resource pools as the first resource pool.

Of course, in the embodiment of the invention, when the LTE-V2X terminal is a TDD-LTE terminal, the first resource pool can alternatively be determined from the list of resource pools according to the TDD sub-frame configuration pattern, and this can be determined by those ordinarily skilled in the art as needed in reality, although the embodiment of the invention will not be limited thereto.

Furthermore in the embodiment of the invention, if there no resource pool, in the list of resource pools, with a parameter different from at least one parameter in the each set of parameter configuration, then the method can further include determining by the NR-V2X terminal the second transmission resource pool as the first resource pool.

In a specific implementation, for example, a part of a first set of parameter configuration transmitted by the first LTE-V2X terminal, and a part of a second set of parameter configuration transmitted by the second LTE-V2X terminal include cell frequencies of cells where the first LTE-V2X terminal and the second LTE-V2X terminal reside, e.g., 1920 MHz and 2025 MHz.

For example, the list of resource pools includes transmission resource pools A and B, and for example, a frequency corresponding to the transmission resource pool A is 1920 MHz, and a frequency corresponding to the transmission resource pool B is 2025 MHz. In this case, the frequencies corresponding to the transmission resource pools in the list of resource pools are the same as the frequencies corresponding to the parts of the sets of parameter configuration, so LTE network communication is interfered with no matter whichever transmission resource pool is selected by the NR-V2X terminal as the first resource pool, and at this time, the originally selected second resource pool can be determined as the first resource pool to thereby avoid a waste of system resources.

In a Third Instance

The assistance information is parameter configuration(s) for direct communication by the LTE-V2X terminal, or parameter configuration(s) for direct communication by the NR-V2X terminal with the LTE-V2X terminal, and the implementation of the step 102 specifically includes the following steps: the NR-V2X terminal selects any one set of parameter configuration from parameter configuration(s) for direct communication by the LTE-V2X terminal or the parameter configuration(s) for direct communication by the NR-V2X terminal with the LTE-V2X terminal as a parameter configuration to be used, and determines a resource pool corresponding to the parameter configuration to be used, as the first resource pool.

In the embodiment of the invention, when the assistance information is the parameter configurations for direct communication by the LTE-V2X terminal, or the parameter configurations for direct communication by the NR-V2X terminal with the LTE-V2X terminal, the LTE base station configures the assistance information while precluding resources for LTE network communication by the LTE-V2X terminal, so the NR-V2X terminal can select a resource pool corresponding to the same parameter configuration with the assistance information directly upon reception of the assistance information.

In a specific implementation, for example, the parameter configurations for direct communication by the LTE-V2X terminal includes: information about a resource pool A (a frequency, a system bandwidth, a TDD sub-frame configuration pattern, etc.), a resource pool B (a frequency, a system bandwidth, a TDD sub-frame configuration pattern, etc.), a resource pool C (a frequency, a system bandwidth, a TDD sub-frame configuration pattern, etc.), etc, or other resource pools, although the embodiment of the invention will not be limited thereto.

Upon reception of the parameter configurations for direct communication transmitted by the LTE-V2X terminal, the NR-V2X terminal selects any one set of parameter configuration from the parameter configurations as parameter configuration to be used, and for example, selects any one set of parameter configuration, e.g., the set of parameter configuration corresponding to the resource pool A, from the sets of parameter configurations corresponding to the resource pool A, the resource pool B, and the resource pool C, and determines the resource pool A as the first resource pool. Alternatively in a specific implementation, the parameter configurations for direct communication by the NR-V2X terminal with the LTE-V2X terminal includes information about a resource pool A (a frequency, a system bandwidth, a TDD sub-frame configuration pattern, etc.), a resource pool B (a frequency, a system bandwidth, a TDD sub-frame configuration pattern, etc.), a resource pool C (a frequency, a system bandwidth, a TDD sub-frame configuration pattern, etc.), etc, or other resource pools, although the embodiment of the invention will not be limited thereto.

Upon reception of the parameter configurations, for direct communication by the NR-V2X terminal with the LTE-V2X terminal, transmitted by the LTE-V2X terminal, the NR-V2X terminal selects any one set of parameter configuration from the parameter configurations as parameter configuration to be used, and for example, selects any one set of parameter configuration, e.g., the set of parameter configuration corresponding to the resource pool A, from the sets of parameter configurations corresponding to the resource pool A, the resource pool B, and the resource pool C, and determines the resource pool A as the first resource pool. Alternatively in a specific implementation, the parameter configurations for direct communication by the NR-V2X terminal with the LTE-V2X terminal include information about a resource pool A (a frequency, a system bandwidth, a TDD sub-frame configuration pattern, etc.), a resource pool B (a frequency, a system bandwidth, a TDD sub-frame configuration pattern, etc.), a resource pool C (a frequency, a system bandwidth, a TDD sub-frame configuration pattern, etc.), etc, or other resource pools, although the embodiment of the invention will not be limited thereto.

Upon reception of the parameter configurations, for direct communication by the NR-V2X terminal with the LTE-V2X terminal, transmitted by the LTE-V2X terminal, the NR-V2X terminal selects any one set of parameter configuration from the parameter configurations as the parameter configuration to be used, and for example, selects any one set of parameter configuration, e.g., the set of parameter configuration corresponding to the resource pool A, from the sets of parameter configurations corresponding to the resource pool A, the resource pool B, and the resource pool C, and determines the resource pool A as the first resource pool.

Those ordinarily skilled in the art can select any one or combination of the three instances above as needed in reality, although the embodiment of the invention will not be limited thereto.

In the embodiment of the invention, after the step 102 is performed, the step 103 is performed in which the NR-V2X terminal communicates directly with the LTE-V2X terminal in the communication range of the NR-V2X terminal over the first resource pool.

In a specific implementation, the NR-V2X terminal communicates directly with the LTE-V2X terminal in the communication range of the NR-V2X terminal over the first resource pool upon determining the first resource pool. In the embodiment of the invention, the LTE-V2X terminal in the communication range of the NR-V2X terminal can be a terminal transmitting assistance information to the NR-V2X terminal, or a terminal which does not transmit any assistance information to the NR-V2X terminal, although the embodiment of the invention will not be limited thereto.

Figure 2:
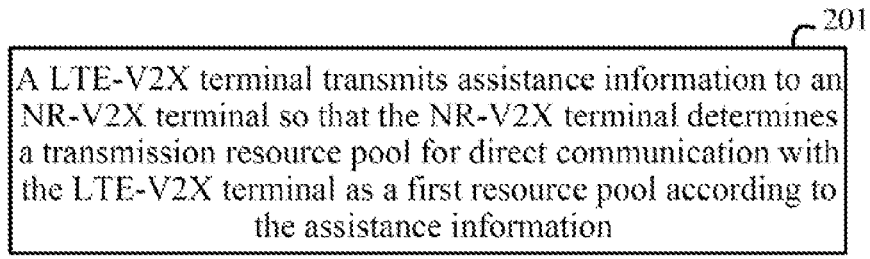
FIG. 2 is a schematic flow chart of a method for determining a resource pool according to an embodiment of the invention.

Based upon the same inventive idea, as illustrated in FIG. 2, a method for determining a resource pool according to an embodiment of the invention includes the following step.

In the step 201, a LTE-V2X terminal transmits assistance information to an NR-V2X terminal so that the NR-V2X terminal can determine a transmission resource pool for direct communication with the LTE-V2X terminal as a first resource pool according to the assistance information.

In the embodiment of the invention, the NR-V2X terminal specifically can be an NR-V2X vehicle, an NR-V2X pedestrian or roadside device, or another type of NR-V2X terminal, although the embodiment of the invention will not be limited thereto. Correspondingly the LTE-V2X terminal specifically can be an LTE-V2X vehicle, an LTE-V2X pedestrian or roadside device, or another type of LTE-V2X terminal, although the embodiment of the invention will not be limited thereto.

In the embodiment of the invention, the assistance information includes any one or combination of:

A part of a parameter configuration for LTE network communication by the LTE-V2X terminal, where the part of the parameter configuration includes at least configuration parameters of a cell where the LTE-V2X terminal resides, and a TDD sub-frame configuration pattern for the LTE-V2X terminal, where the configuration parameters of the cell include a cell frequency and a system bandwidth;

Parameter configurations for direct communication by the LTE-V2X terminal; or Parameter configurations for direct communication by the NR-V2X terminal with the LTE-V2X terminal.

In the embodiment of the invention, the assistance information includes but will not be limited to the following several instances which will be described below respectively.

In a First Instance

The assistance information is a part of a parameter configuration for communication by the LTE-V2X terminal via an air interface, etc., a Uu interface, after residing in a cell, e.g., a cell frequency and a system bandwidth of the cell where the LTE-V2X terminal resides. By way of an example, the system bandwidth can include 1.4 MHz, 5 MHz, or 20 MHz in an LTE network. When the LTE-V2X terminal is a TDD-LTE terminal, the assistance information can include a TDD sub-frame configuration pattern, etc., of the LTE-V2X terminal, although the embodiment of the invention will not be limited thereto.

In a Second Instance

The assistance information is a full set of transmission resource pool information for direct communication, i.e., for transmitting information via a PC-5 interface, configured by an LTE network for the LTE-V2X terminal, e.g., a resource pool A (a frequency, a system bandwidth, a TDD sub-frame configuration pattern, etc.), a resource pool B (a frequency, a system bandwidth, a TDD sub-frame configuration pattern, etc.), a resource pool C (a frequency, a system bandwidth, a TDD sub-frame configuration pattern, etc.), etc, or other resource pools, although the embodiment of the invention will not be limited thereto.

In this case, the LTE-V2X terminal can communicate directly with another LTE-V2X terminal or the NR-V2X terminal, although the embodiment of the invention will not be limited thereto.

In a Third Instance

The assistance information is a full set of transmission resource pool information for direct communication, i.e., for transmitting information via a PC-5 interface, with the LTE-V2X terminal, configured by an LTE base station for the NR-V2X terminal according to configuration and resource use conditions of the LTE base station, e.g., a resource pool A (a frequency, a system bandwidth, a TDD sub-frame configuration pattern, etc.), a resource pool B (a frequency, a system bandwidth, a TDD sub-frame configuration pattern, etc.), a resource pool C (a frequency, a system bandwidth, a TDD sub-frame configuration pattern, etc.), etc, or other resource pools, although the embodiment of the invention will not be limited thereto.

In a Fourth Instance

The assistance information includes a part of a parameter configuration for communication by the LTE-V2X terminal via an air interface, etc., a Uu interface, after residing in a cell, a full set of transmission resource pool information for direct communication, i.e., for transmitting information via a PC-5 interface, configured by an LTE network for the LTE-V2X terminal, and a full set of transmission resource pool information for direct communication with the LTE-V2X terminal, configured by an LTE base station for the NR-V2X terminal.

Those ordinarily skilled in the art can select one of the four instances of the assistance information above as needed in reality, although the embodiment of the invention will not be limited thereto.

In the embodiment of the invention, there are the following instances of a specific implementation of the step 201 as to be described below respectively.

In a First Instance

The LTE-V2X terminal receives the assistance information generated and transmitted by an LTE base station.

The LTE-V2X terminal forwards the assistance information to the NR-V2X terminal.

In a specific implementation, in addition to transmitting to the LTE-V2X terminal the network resource for LTE network communication by the LTE-V2X terminal, the LTE base station further carries the assistance information, for the NR-V2X terminal to determine the resource pool, generated by the LTE base station according to the configuration and resource use conditions of the LTE base station, in a system message and/or dedicated signaling carrying the network resource for LTE network communication by the LTE-V2X terminal, and the LTE-V2X terminal forwards the assistance information to the NR-V2X terminal upon reception of the assistance information.

In the embodiment of the invention, the LTE base station transmits the assistance information to the LTE-V2X terminal in a radio resource control message, e.g., a Master Information Block (MIB) or another new radio resource control message, or carries the assistance information in a media access control layer control element, and transmits the control element to the LTE-V2X terminal.

In a Second Instance

If the assistance information is specifically a part of the parameter configuration for LTE network communication by the LTE-V2X terminal, or the parameter configuration by the LTE-V2X terminal, then the LTE-V2X terminal transmits the assistance information to the NR-V2X terminal as follows: the LTE-V2X terminal obtains a part of the parameter configuration for LTE network communication in the system message and/or the dedicated signaling, and the LTE-V2X terminal transmits the part of the parameter configuration to the NR-V2X terminal; or the LTE-V2X terminal transmits the assistance information to the NR-V2X terminal as follows: the LTE-V2X terminal obtains the parameter configuration for direct communication by the LTE-V2X terminal from the system message and/or the dedicated signaling, and transmits it.

In a specific implementation, when the assistance information is specifically the first and second instances of the assistance information above, the assistance information can alternatively be obtained and generated by the LTE-V2X terminal. For example, the LTE-V2X terminal can obtain a part of the parameter configuration for LTE network communication in the system message and/or the dedicated signaling broadcasted by the LTE base station, and then transmit it to the NR-V2X terminal, where the obtained parameter configuration can include a cell frequency and a system bandwidth of the cell where the LTE-V2X terminal resides, or the obtained parameter configuration can include a TDD sub-frame configuration pattern for the LTE-V2X terminal. In another example, the LTE-V2X terminal can obtain the parameter configuration for direct communication by the LTE-V2X terminal from the dedicated signaling transmitted by the LTE base station, store the obtained parameter configuration for direct communication, and transmit it to the NR-V2X terminal as needed.

Those ordinarily skilled in the art can select one of the two implementations above as needed in reality, although the embodiment of the invention will not be limited thereto.

In the embodiment of the invention, an LTE-V2X terminal adjacent to the LTE-V2X terminal can refer to or skip directly the assistance information transmitted by the LTE-V2X terminal upon reception of the assistance information, although the embodiment of the invention will not be limited thereto.

In the embodiment of the invention, the LTE-V2X terminal transmits the assistance information to the NR-V2X terminal so that the NR-V2X terminal can determine the resource pool according to the assistance information transmitted by the LTE-V2X terminal while precluding transmission resources, e.g., with a frequency, a TDD sub-frame configuration pattern, etc., colliding with network resources for LTE network communication by the LTE-V2X terminal, to thereby avoid interference with LTE network communication as much as possible.

Figure 3:
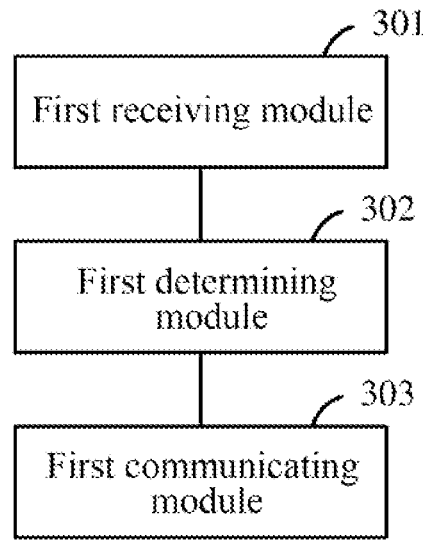
FIG. 3 is a schematic structural diagram of a terminal according to an embodiment of the invention.

Based upon the same inventive idea, an embodiment of the invention provides a terminal, and reference can be made to the description of the method embodiment above for a particular implementation of the terminal, so a repeated description thereof will be omitted here; and as illustrated in FIG. 3, the terminal generally includes the following modules.

A first receiving module 301 is configured to receive assistance information transmitted by an LTE-V2X terminal, a first determining module 302 configured to determine a first resource pool based upon the assistance information, and a first communicating module 303 configured to communicate directly with the LTE-V2X terminal in a communication range of an NR-V2X terminal using the first resource pool, where the first resource pool is a transmission resource pool for direct communication by the NR-V2X terminal with the LTE-V2X terminal.

In a possible implementation, the assistance information includes any one or combination of:

A part of a parameter configuration for LTE network communication by the LTE-V2X terminal, where the part of the parameter configuration includes at least configuration parameters of a cell where the LTE-V2X terminal resides, and a TDD sub-frame configuration pattern for the LTE-V2X terminal, where the configuration parameters of the cell include a cell frequency and a system bandwidth;

Parameter configurations for direct communication by the LTE-V2X terminal; or

Parameter configurations for direct communication by the NR-V2X terminal with the LTE-V2X terminal.

In a possible implementation, the first receiving module 301 is configured to receive the assistance information generated by an LTE base station, and forwarded through the LTE-V2X terminal.

In a possible implementation, if the assistance information is specifically a part of a parameter configuration for LTE network communication by the LTE-V2X terminal, or parameter configurations for direct communication by the LTE-V2X terminal, then the first receiving module 301 is configured: to receive a part of the parameter configuration obtained by the LTE-V2X terminal from the parameter configuration for LTE network communication in a system message and/or dedicated signaling, and transmitted by the LTE-V2X terminal; or to receive the parameter configurations for direction communication obtained by the LTE-V2X terminal from a system message and/or dedicated signaling, and transmitted by the LTE-V2X terminal.

In a possible implementation, the first determining module 302 is configured: to determine according to the assistance information whether direct communication by the NR-V2X terminal with the LTE-V2X terminal using a second resource pool interferes with LTE network communication, where the second resource pool is a transmission resource pool for direct communication by the LTE-V2X terminal in the communication range of the NR-V2X terminal before the NR-V2X terminal receives the assistance information; and if so, to adjust the transmission resource pool for direct communication with the LTE-V2X terminal from the second resource pool to the first resource pool according to the assistance information.

In a possible implementation, if the first receiving module 301 is configured to receive first assistance information transmitted by a first LTE-V2X terminal at a first instance of time, where the first LTE-V2X terminal is any one of LTE-V2X terminals in the communication range of the NR-V2X terminal, then the first determining module 302 is configured to determine whether other assistance information transmitted by another LTE-V2X terminal than the first LTE-V2X terminal is received in a preset time period after the first instance of time, and if not, to adjust the transmission resource pool for direct communication with the LTE-V2X terminal from the second resource pool to the first resource pool based upon the first assistance information.

In a possible implementation, if the first receiving module 301 is configured to receive a plurality of sets of parameter configurations at the same instance of time, transmitted by a plurality of LTE-V2X terminals, the plurality of sets of parameter configurations corresponding to the plurality of LTS-V2X terminals, where each set of parameter configuration is a part of a parameter configuration, corresponding to each LTE-V2X terminal, for LTE network communication, then the first determining module 302 is configured to determine whether there is a resource pool, in the list of resource pools, with a parameter different from at least one parameter in the each set of parameter configuration, and if so, to determine the resource pool with a parameter different from at least one parameter in the each set of parameter configuration as the first resource pool.

In a possible implementation, if there is no resource pool, in the list of resource pools, with a parameter different from at least one parameter in the each set of parameter configuration, then the first determining module 302 is further configured to determine the second transmission resource pool as the first resource pool.

In a possible implementation, if the first receiving module 301 is configured to receive parameter configurations, for direct communication by the LTE-V2X terminal, transmitted by the LTE-V2X terminal, or to receive parameter configurations for direct communication by the NR-V2X terminal with the LTE-V2X terminal, then the first determining module 302 is configured to select any one set of parameter configuration from the parameter configurations for direct communication by the LTE-V2X terminal, or the parameter configurations for direct communication by the NR-V2X terminal with the LTE-V2X terminal as a parameter configuration to be used, and to determine a resource pool corresponding to the parameter configuration to be used, as the first resource pool.

Figure 4:
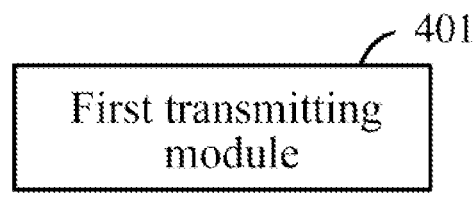
FIG. 4 is a schematic structural diagram of a terminal according to an embodiment of the invention.

Based upon the same inventive idea, an embodiment of the invention provides a terminal, and reference can be made to the description of the method embodiment above for a specific implementation of the terminal, so a repeated description thereof will be omitted here; and as illustrated in FIG. 4, the terminal generally includes the following modules.

A first transmitting module 401 is configured to transmit assistance information to an NR-V2X terminal so that the NR-V2X terminal determines a first resource pool according to the assistance information, where the first resource pool is a transmission resource pool for direct communication by the NR-V2X terminal with an LTE-V2X terminal.

In a possible implementation, the assistance information includes any one or combination of:

A part of a parameter configuration for LTE network communication by the LTE-V2X terminal, where the part of the parameter configuration includes at least configuration parameters of a cell where the LTE-V2X terminal resides, and a TDD sub-frame configuration pattern for the LTE-V2X terminal, where the configuration parameters of the cell include a cell frequency and a system bandwidth;

Parameter configurations for direct communication by the LTE-V2X terminal; or

Parameter configurations for direct communication by the NR-V2X terminal with the LTE-V2X terminal.

In a possible implementation, the first transmitting module 401 is configured: to receive the assistance information generated and transmitted by an LTE base station; and to forward the assistance information to the NR-V2X terminal.

In a possible implementation, if the assistance information is specifically a part of a parameter configuration for LTE network communication by the LTE-V2X terminal, or parameter configurations for direct communication by the LTE-V2X terminal, then the first transmitting module 401 is configured: to obtain a part of the parameter configuration for LTE network communication in a system message and/or dedicated signaling, and to transmit the part of the parameter configuration to the NR-V2X terminal; or to obtain the parameter configurations for direct communication by the LTE-V2X terminal from a system message and/or dedicated signaling, and to transmit the parameter configurations.

Figure 5:
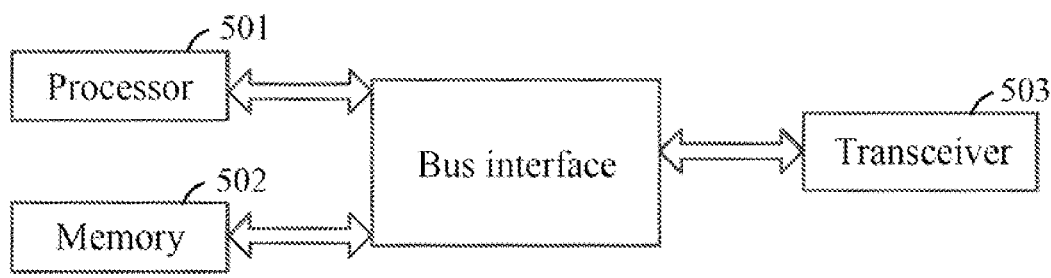
FIG. 5 is a schematic structural diagram of another terminal according to an embodiment of the invention.

Based upon the same inventive idea, an embodiment of the invention provides a terminal, and reference can be made to the description of the method embodiment above for a particular implementation of the terminal, so a repeated description thereof will be omitted here. As illustrated in FIG. 5, the terminal generally includes a processor 501, a memory 502, and a transceiver 503, where the transceiver 503 receives and transmits data under the control of the processor 501, the memory 502 stores preset program, and the processor 501 reads and executes the program in the memory 502: to receive assistance information transmitted by an LTE-V2X terminal through the transceiver 503, to determine a first resource pool based upon the assistance information, and to communicate directly with the LTE-V2X terminal in a communication range of an NR-V2X terminal using the first resource pool, where the first resource pool is a transmission resource pool for direct communication by the NR-V2X terminal with the LTE-V2X terminal.

In a possible implementation, the assistance information includes any one or combination of:

A part of a parameter configuration for LTE network communication by the LTE-V2X terminal, where the part of the parameter configuration includes at least configuration parameters of a cell where the LTE-V2X terminal resides, and a TDD sub-frame configuration pattern for the LTE-V2X terminal, where the configuration parameters of the cell include a cell frequency and a system bandwidth;

Parameter configurations for direct communication by the LTE-V2X terminal; or

Parameter configurations for direct communication by the NR-V2X terminal with the LTE-V2X terminal.

In a possible implementation, the processor 501 is configured to instruct the transceiver 503 to receive the assistance information generated by an LTE base station, and forwarded through the LTE-V2X terminal.

In a possible implementation, if the assistance information is specifically a part of a parameter configuration for LTE network communication by the LTE-V2X terminal, or parameter configurations for direct communication by the LTE-V2X terminal, then the processor 501 is configured: to instruct the transceiver 503 to receive a part of the parameter configuration obtained by the LTE-V2X terminal from the parameter configuration for LTE network communication in a system message and/or dedicated signaling, and transmitted by the LTE-V2X terminal; or to instruct the transceiver 503 to receive the parameter configuration for direction communication obtained by the LTE-V2X terminal from a system message and/or dedicated signaling, and transmitted by the LTE-V2X terminal.

In a possible implementation, the processor 501 is configured: to determine according to the assistance information whether direct communication by the NR-V2X terminal with the LTE-V2X terminal using a second resource pool interferes with LTE network communication, where the second resource pool is a transmission resource pool used by the NR-V2X for direct communication with the LTE-V2X terminal in the communication range of the NR-V2X terminal before the NR-V2X terminal receives the assistance information; and if so, to adjust the transmission resource pool for direct communication with the LTE-V2X terminal from the second resource pool to the first resource pool according to the assistance information.

In a possible implementation, the processor 501 is configured: to instruct the transceiver 503 to receive first assistance information transmitted by a first LTE-V2X terminal at a first instance of time, where the first LTE-V2X terminal is any one of LTE-V2X terminals in the communication range of the NR-V2X terminal; and to determine whether other assistance information transmitted by another LTE-V2X terminal than the first LTE-V2X terminal is received in a preset time period after the first instance of time, and if not, to adjust the transmission resource pool for direct communication with the LTE-V2X terminal from the second resource pool to the first resource pool based upon the first assistance information.

In a possible implementation, the processor 501 is configured: to instruct the transceiver 503 to receive a plurality of sets of parameter configurations, transmitted by a plurality of LTE-V2X terminals, corresponding to the LTE-V2X terminals at the same instance of time, where each set of parameter configuration is a part of a parameter configuration, corresponding to each LTE-V2X terminal, for LTE network communication; and to determine whether there is a resource pool, in the list of resource pools, with a parameter different from at least one parameter in the each set of parameter configuration, and if so, to determine the resource pool with a parameter different from at least one parameter in the each set of parameter configuration as the first resource pool.

In a possible implementation, the processor 501 is further configured: if there is no resource pool, in the list of resource pools, with a parameter different from at least one parameter in the each set of parameter configuration, to determine the second transmission resource pool as the first resource pool.

In a possible implementation, the processor 501 is further configured: to instruct the transceiver 503 to receive parameter configurations, for direct communication by the LTE-V2X terminal, transmitted by the LTE-V2X terminal, or parameter configurations for direct communication by the NR-V2X terminal with the LTE-V2X terminal; to select any one set of parameter configuration from the parameter configurations for direct communication by the LTE-V2X terminal or the parameter configurations for direct communication by the NR-V2X terminal with the LTE-V2X terminal as a parameter configuration to be used; and to determine a resource pool corresponding to the parameter configuration to be used, as the first resource pool.

Figure 6:
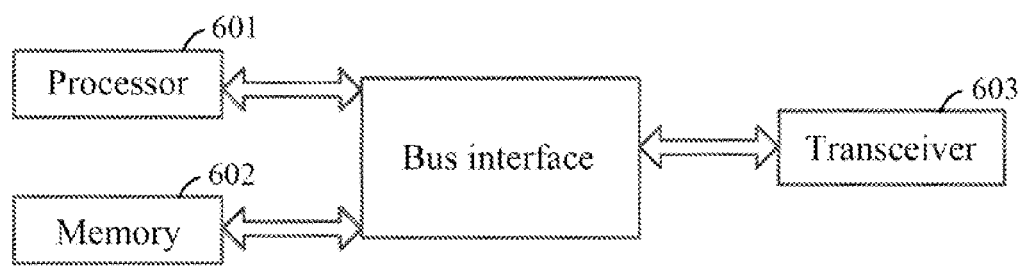
FIG. 6 is a schematic structural diagram of another terminal according to an embodiment of the invention.

Based upon the same inventive idea, an embodiment of the invention provides a terminal, and reference can be made to the description of the method embodiment above for a specific implementation of the terminal, so a repeated description thereof will be omitted here. As illustrated in FIG. 6, the terminal generally includes a processor 601, a memory 602, and a transceiver 603, where the transceiver 603 receives and transmits data under the control of the processor 601, the memory 602 stores preset program, and the processor 601 reads and executes the program in the memory 602: to transmit assistance information to an NR-V2X terminal through the transceiver 603 so that the NR-V2X terminal determines a first resource pool according to the assistance information, where the first resource pool is a transmission resource pool for direct communication by the NR-V2X terminal with an LTE-V2X terminal.

In a possible implementation, the assistance information includes any one or combination of:

A part of a parameter configuration for LTE network communication by the LTE-V2X terminal, where the part of the parameter configuration includes at least configuration parameters of a cell where the LTE-V2X terminal resides, and a TDD sub-frame configuration pattern for the LTE- V2X terminal, where the configuration parameters of the cell include a cell frequency and a system bandwidth;

Parameter configurations for direct communication by the LTE-V2X terminal; or Parameter configurations for direct communication by the NR-V2X terminal with the LTE-V2X terminal.

In a possible implementation, the processor 601 is configured: to instruct the transceiver 603 to receive the assistance information generated and transmitted by an LTE base station; and to instruct the transceiver 603 to forward the assistance information to the NR-V2X terminal.

In a possible implementation, if the assistance information is particularly a part of a parameter configuration for LTE network communication by the LTE-V2X terminal, or parameter configurations for direct communication by the LTE-V2X terminal, then the processor 601 is configured: to instruct the transceiver 603 to obtain a part of the parameter configuration for LTE network communication in a system message and/or dedicated signaling, and to instruct the transceiver 603 to transmit the part of the parameter configuration to the NR-V2X terminal; or to instruct the transceiver 603 to obtain the parameter configurations for direct communication by the LTE-V2X terminal from a system message and/or dedicated signaling, and to transmit it through the transceiver 603.

An embodiment of the invention further provides a computer storage medium storing computer executable instructions configured to cause the computer to perform the method above performed by the NR-V2X terminal.

An embodiment of the invention further provides a computer storage medium storing computer executable instructions configured to cause the computer to perform the method above performed by the LTE-V2X terminal.

With the technical solutions above according to the embodiments of the invention, an NR-V2X terminal receives assistance information transmitted by an LTE-V2X terminal, the NR-V2X terminal determines a transmission resource pool for direct communication with the LTE-V2X terminal as a first resource pool based upon the assistance information, and the NR-V2X terminal communicates directly with the LTE-V2X terminal in a communication range of the NR-V2X terminal using the first resource pool. In this way, the NR-V2X terminal can determine the transmission resource pool according to the assistance information transmitted by the LTE-V2X terminal while precluding transmission resources, e.g., with a frequency, a TDD sub-frame configuration pattern, etc., colliding with network resources for LTE network communication by the LTE-V2X terminal, to thereby avoid interference with LTE network communication as much as possible. Accordingly the technical solutions according to the embodiments of the invention can address in effect the technical problem in the prior art that the NR-V2X terminal fails to be configured precisely by the network in an area which is not covered with any NR network, and thus may select a resource pool imprecisely, thus interfering with communication over the LTE network.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for determining a resource pool, comprising:
    receiving, by a Next-generation Radio Access Technology-Vehicle to Everything (NR-V2X) terminal, assistance information transmitted by a Long Term Evolution-Vehicle to Everything (LTE-V2X) terminal;
    determining, by the NR-V2X terminal, a first resource pool based upon the assistance information, wherein the first resource pool is a transmission resource pool for direct communication by the NR-V2X terminal with the LTE-V2X terminal; and
    communicating, by the NR-V2X terminal, directly with the LTE-V2X terminal in a communication range of the NR-V2X terminal using the first resource pool;
    wherein the assistance information transmitted by the LTE-V2X terminal to the NR-V2X terminal comprises any one or combination of:
    a part of a parameter configuration for LTE network communication by the LTE-V2X terminal, wherein the part of the parameter configuration comprises at least configuration parameters of a cell where the LTE-V2X terminal resides and a Time Division Duplexing (TDD) sub-frame configuration pattern for the LTE-V2X terminal, wherein the configuration parameters of the cell comprise a cell frequency and a system bandwidth;
    parameter configurations for direct communication by the LTE-V2X terminal; or parameter configurations for direct communication by the NR-V2X terminal with the LTE-V2X terminal.

2. The method according to claim 1, wherein receiving, by the NR-V2X terminal, the assistance information transmitted by the LTE-V2X terminal comprises:
receiving, by the NR-V2X terminal, the assistance information generated by an LTE base station, and forwarded through the LTE-V2X terminal.

3. The method according to claim 1, wherein the assistance information is a part of a parameter configuration for LTE network communication by the LTE-V2X terminal, or parameter configurations for direct communication by the LTE-V2X terminal; and
receiving, by the NR-V2X terminal, the assistance information transmitted by the LTE-V2X terminal comprises:
receiving, by the NR-V2X terminal, a part of the parameter configuration obtained by the LTE-V2X terminal from the parameter configuration for LTE network communication in at least one of a system message and dedicated signaling, and transmitted by the LTE-V2X terminal; or
receiving, by the NR-V2X terminal, the parameter configurations for direction communication obtained by the LTE-V2X terminal from at least one of a system message and dedicated signaling, and transmitted by the LTE-V2X terminal.

4. The method according to claim 1, wherein determining, by the NR-V2X terminal, the first resource pool based upon the assistance information comprises:
determining, by the NR-V2X terminal, according to the assistance information whether direct communication by the NR-V2X terminal with the LTE-V2X terminal using a second resource pool interferes with LTE network communication, wherein the second resource pool is a transmission resource pool used by the NR-V2X terminal for direct communication with the LTE-V2X terminal in the communication range of the NR-V2X terminal before the NR-V2X terminal receives the assistance information; and
if so, then adjusting, by the NR-V2X terminal, the transmission resource pool for direct communication with the LTE-V2X terminal from the second resource pool to the first resource pool according to the assistance information.

5. The method according to claim 4, wherein receiving, by the NR-V2X terminal, the assistance information transmitted by the LTE-V2X terminal comprises:
receiving, by the NR-V2X terminal, first assistance information transmitted by a first LTE-V2X terminal at a first instance of time, wherein the first LTE-V2X terminal is any one of LTE-V2X terminals in the communication range of the NR-V2X terminal; and
adjusting, by the NR-V2X terminal, the transmission resource pool for direct communication with the LTE-V2X terminal from the second resource pool to the first resource pool according to the assistance information comprises:
determining, by the NR-V2X terminal, whether other assistance information transmitted by another LTE-V2X terminal than the first LTE-V2X terminal is received in a preset time period after the first instance of time, and if not, then adjusting, by the NR-V2X terminal, the transmission resource pool for direct communication with the LTE-V2X terminal from the second resource pool to the first resource pool according to the first assistance information.

6. The method according to claim 4, wherein receiving, by the NR-V2X terminal, the assistance information transmitted by the LTE-V2X terminal comprises:
receiving, by the NR-V2X terminal, a plurality of sets of parameter configurations at same instance of time transmitted by a plurality of LTE-V2X terminals, wherein each of the sets of parameter configurations is a part of a parameter configuration, corresponding to each LTE-V2X terminal, for LTE network communication; and
adjusting, by the NR-V2X terminal, the transmission resource pool for direct communication with the LTE-V2X terminal from the second resource pool to the first resource pool according to the assistance information comprises:
determining, by the NR-V2X terminal, whether there is a resource pool, in a list of resource pools, with a parameter different from at least one parameter in the each set of parameter configuration; and
if so, then determining, by the NR-V2X terminal, the resource pool with a parameter different from at least one parameter in the each set of parameter configuration as the first resource pool; otherwise, determining, by the NR-V2X terminal, the second transmission resource pool as the first resource pool.

7. The method according to claim 1, wherein receiving, by the NR-V2X terminal, the assistance information transmitted by the LTE-V2X terminal comprises:
receiving, by the NR-V2X terminal, from the LTE-V2X terminal parameter configurations, for direct communication by the LTE-V2X terminal, or parameter configurations for direct communication by the NR-V2X terminal with the LTE-V2X terminal; and
determining, by the NR-V2X terminal, the first resource pool based upon the assistance information comprises:
selecting, by the NR-V2X terminal, any one parameter configuration from the parameter configurations for direct communication by the LTE-V2X terminal, or the parameter configurations for direct communication by the NR-V2X terminal with the LTE-V2X terminal as a parameter configuration to be used, and determining, by the NR-V2X terminal, a resource pool corresponding to the parameter configuration to be used, as the first resource pool.

8. A method for determining a resource pool, comprising:
transmitting, by a Long Term Evolution-Vehicle to Everything (LTE-V2X) terminal, assistance information to a Next-generation Radio Access Technology-Vehicle to Everything (NR-V2X) terminal so that the NR-V2X terminal determines a first resource pool according to the assistance information, wherein the first resource pool is a transmission resource pool for direct communication by the NR-V2X terminal with the LTE-V2X terminal;
wherein the assistance information comprises any one or combination of:
a part of a parameter configuration for LTE network communication by the LTE-V2X terminal, wherein the part of the parameter configuration comprises at least configuration parameters of a cell where the LTE-V2X terminal resides and a Time Division Duplexing (TDD) sub-frame configuration pattern for the LTE-V2X terminal, wherein the configuration parameters of the cell comprise a cell frequency and a system bandwidth;
parameter configurations for direct communication by the LTE-V2X terminal; and parameter configurations for direct communication by the NR-V2X terminal with the LTE-V2X terminal.

9. The method according to claim 8, wherein transmitting, by the LTE-V2X terminal, the assistance information to the NR-V2X terminal comprises:
receiving, by the LTE-V2X terminal, the assistance information generated and transmitted by an LTE base station; and
forwarding, by the LTE-V2X terminal, the assistance information to the NR-V2X terminal.

10. The method according to claim 8, wherein the assistance information is a part of the parameter configuration for LTE network communication by the LTE-V2X terminal, or the parameter configurations for direct communication by the LTE-V2X terminal; and
transmitting, by the LTE-V2X terminal, the assistance information to the NR-V2X terminal comprises:
obtaining, by the LTE-V2X terminal, a part of the parameter configuration for LTE network communication in at least one of a system message and dedicated signaling, and transmitting, by the LTE-V2X terminal, the part of the parameter configuration to the NR-V2X terminal, or transmitting, by the LTE-V2X terminal, the assistance information to the NR-V2X terminal comprises:
obtaining, by the LTE-V2X terminal, the parameter configurations for direct communication by the LTE-V2X terminal from at least one of a system message and dedicated signaling, and transmitting the parameter configurations.

11. A Next-generation Radio Access Technology-Vehicle to Everything (NR-V2X) terminal, comprising: a processor, a transceiver, and a memory, wherein:
the processor is configured to read and execute program in the memory: to receive assistance information transmitted by a Long Term Evolution-Vehicle to Everything (LTE-V2X) terminal through the transceiver, to determine a first resource pool based upon the assistance information, and to communicate directly with the LTE-V2X terminal in a communication range of an NR-V2X terminal using the first resource pool, wherein the first resource pool is a transmission resource pool for direct communication by the NR-V2X terminal with the LTE-V2X terminal; and
the transceiver configured to receive and transmit data under the control of the processor;
wherein the assistance information comprises any one or combination of:
a part of a parameter configuration for LTE network communication by the LTE-V2X terminal, wherein the part of the parameter configuration comprises at least configuration parameters of a cell where the LTE-V2X terminal resides and a Time Division Duplexing (TDD) sub-frame configuration pattern for the LTE-V2X terminal, wherein the configuration parameters of the cell comprise a cell frequency and a system bandwidth;
parameter configurations for direct communication by the LTE-V2X terminal; or
parameter configurations for direct communication by the NR-V2X terminal with the LTE-V2X terminal.

12. The terminal according to claim 11, wherein the assistance information is a part of a parameter configuration for LTE network communication by the LTE-V2X terminal, or parameter configurations for direct communication by the LTE-V2X terminal; and the processor is configured:
to instruct the transceiver to receive a part of the parameter configuration obtained by the LTE-V2X terminal from the parameter configuration for LTE network communication in at least one of a system message and dedicated signaling, and transmitted by the LTE-V2X terminal; or
to instruct the transceiver to receive the parameter configuration for direction communication obtained by the LTE-V2X terminal from at least one of a system message and dedicated signaling, and transmitted by the LTE-V2X terminal.

13. The terminal according to claim 11, wherein the processor is configured:
to determine according to the assistance information whether direct communication by the NR-V2X terminal with the LTE-V2X terminal using a second resource pool interferes with LTE network communication, wherein the second resource pool is a transmission resource pool used by the NR-V2X for direct communication with the LTE-V2X terminal in the communication range of the NR-V2X terminal before the NR-V2X terminal receives the assistance information; and
if so, to adjust the transmission resource pool for direct communication with the LTE-V2X terminal from the second resource pool to the first resource pool according to the assistance information.

14. The terminal according to claim 13, wherein the processor is configured:
to instruct the transceiver to receive first assistance information transmitted by a first LTE-V2X terminal at a first instance of time, wherein the first LTE-V2X terminal is any one of LTE-V2X terminals in the communication range of the NR-V2X terminal;
to determine whether other assistance information transmitted by another LTE-V2X terminal than the first LTE-V2X terminal is received in a preset time period after the first instance of time; and
if not, to adjust the transmission resource pool for direct communication with the LTE-V2X terminal from the second resource pool to the first resource pool based upon the first assistance information.

15. The terminal according to claim 11, wherein the processor is configured:
to instruct the transceiver to receive parameter configurations, for direct communication by the LTE-V2X terminal, transmitted by the LTE-V2X terminal, or parameter configurations for direct communication by the NR-V2X terminal with the LTE-V2X terminal;
to select any one set of parameter configuration from the parameter configurations for direct communication by the LTE-V2X terminal or the parameter configurations for direct communication by the NR-V2X terminal with the LTE-V2X terminal as a parameter configuration to be used; and
to determine a resource pool corresponding to the parameter configuration to be used, as the first resource pool.

16. A Long Term Evolution-Vehicle to Everything (LTE-V2X) terminal, comprising: a processor, a transceiver, and a memory, wherein:
the processor is configured to read and execute program in the memory: to transmit assistance information to a Next-generation Radio Access Technology-Vehicle to Everything (NR-V2X) terminal through the transceiver so that the NR-V2X terminal determines a first resource pool according to the assistance information, wherein the first resource pool is a transmission resource pool for direct communication by the NR-V2X terminal with the LTE-V2X terminal; and the transceiver configured to receive and transmit data under the control of the processor;

wherein the assistance information comprises any one or combination of:

a part of a parameter configuration for LTE network communication by the LTE-V2X terminal, wherein the part of the parameter configuration comprises at least configuration parameters of a cell where the LTE-V2X terminal resides and a Time Division Duplexing (TDD) sub-frame configuration pattern for the LTE-V2X terminal, wherein the configuration parameters of the cell comprise a cell frequency and a system bandwidth;

parameter configurations for direct communication by the LTE-V2X terminal; or parameter configurations for direct communication by the NR-V2X terminal with the LTE-V2X terminal.

* * * * *